United States Patent Office 3,114,603
Patented Dec. 17, 1963

3,114,603
PROCESS FOR SYNTHETIC ZEOLITE A
Peter A. Howell, Grand Island, N.Y., assignor to Union
Carbide Corporation, a corporation of New York
No Drawing. Filed Jan 15, 1960, Ser. No. 2,593
10 Claims. (Cl. 23—113)

This invention relates to a process for preparing a synthetic zeolitic molecular sieve known as zeolite A. More particularly, the invention relates to a process for synthesizing zeolite A from kaolin-type minerals whereby high purity zeolite A is obtained in commercially attractive yields and reaction times.

Zeolite A is a synthetic three-dimensional crystalline zeolite of the molecular sieve type, which is to say that upon activation by the removal of at least part of its water of crystallization, its crystal structure remains intact and is characterized by the possession of internal adsorption areas accessible through openings or pores of definite dimensions. When zeolite A is synthesized from reactant mixtures containing substantial amounts of sodium cations, the sodium form is obtained which when activated is particularly useful for the adsorption of molecules having critical dimensions smaller than about 4 Angstrom units while refusing larger sized molecules.

Sodium zeolite A is a synthetic rigid three-dimensional crystalline zeolite of the molecular sieve type which may be represented by the formula:

$$1.0 \pm 0.2 \; Na_2:Al_2O_3:1.85 \pm 0.5 \; SiO_2:YH_2O$$

wherein Y may have any value from essentially zero up to about 5.1. Sodium zeolite A has an X-ray powder diffraction pattern characterized by at least those reflections set forth in Table A below.

TABLE A

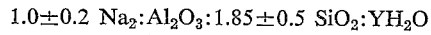

dValues of Reflection in A 12.2±0.2
8.6±0.15
7.02±0.15
5.45±0.10
4.06±0.05
3.68±0.05
3.38±0.05
3.26±0.05
2.96±0.05
2.73±0.05
2.61±0.05

Sodium zeolite A, its properties, and a process for its preparation are described in detail in U.S. Patent 2,882,243, issued April 14, 1959, to R. M. Milton.

The above-identified patent also described the modification of the selective adsorption properties of sodium zeolite A that can be obtained through cation exchange. For instance, when at least about 40 percent of the sodium cations are exchanged for divalent calcium cations the characteristic adsorption pore size is enlarged to about 5 Angstrom units yielding a molecular sieve which has been found to be extremely useful in petroleum processing directed toward octane improvement of motor fuels.

Crystalline zeolite A consists basically of a rigid three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two, or $$0/(Al+Si) = 2.$$

The electrovalence of each tetrahedra containing aluminum is balanced by the inclusion in the crystal of a cation, for example, an alkali or alkaline earth metal ion. One cation may be exchanged for another by various ion exchange techniques. The spaces between the tetrahedra are occupied by water molecules prior to dehydration or activation of the crystal.

The various types of crystalline molecular sieve zeolites may among other ways be differentiated on the basis of adsorption pore size or the operative pore diameter defined by the crystal structure. They are also distinguishable by virtue of the particular cation or cations such as sodium or calcium which have been integrated into the crystal.

Among the ways of identifying crystalline zeolite of the molecular sieve type and distinguishing them from other crystalline substances, the X-ray powder diffraction pattern has been found extremely useful. This technique, particularly when associated with the results of the chemical analysis of the crystalline product, is a reliable means of identification. For instance, if one were to rely on chemical analysis alone, it would be difficult to accurately distinguish a true crystalline zeolite from a chemically similar but structurally different material such as sodalite or hydroxy-sodalite. Hydroxy-sodalite is a felspathoid material having the formula:

$$Na_2O \cdot Al_2O_3 \cdot 2SiO_2 \cdot xNaOH$$

in which, unlike crystalline zeolite A here discussed, NaOH fills the cavities of the structure. In other sodalite-type materials, the occluded substance may be, for example, sodium halide or various sulfates and nitrates. Consequently, sodalite-type materials do not exhibit the adsorption characteristics of crystalline zeolite of the molecular type.

In the prior art it has been reported that various clays may be mixed with solutions of alkali hydroxides and carbonates to give materials identified only by chemical analysis, without evidence as to structure, as alkali aluminum silicates.

In order that the benefits of the selective adsorption processes based on zeolite A can be economically achieved it has been desired that the synthesis of zeolite A be made as economical as possible.

Methods for preparing crystalline zeolite A from standard commercial reactants including sodium silicate, silicic acid, silica gel, alumina, and sodium aluminate are known.

Although the known processes for preparing crystalline sodium zeolite A are satisfactory from a technical standpoint, economic considerations require a process employing lower-cost reactant materials, preferably where a reduction in the number of reactant mixing steps can be realized, but at the same time achieving a sodium zeolite A product of particularly high purity.

As herein used, the terms "product purity" in percent, and "product composition" in percent, when based on the X-ray method of analysis are defined as follows:

$$\frac{S_1}{S_2} \times 100 = \text{percent purity}$$

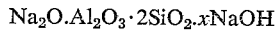

where $S_1$ = sum of intensities of suitable X-ray lines measured on the zeolite A sample.

$S_2$ = sum of intensities of suitable X-ray lines measured on the zeolite A reference standard.

It is therefore an object of the present invention to provide a process for the efficient production of high-purity crystalline zeolite A.

A further object is to provide a process which utilizes a commercially economical starting material.

In brief, it has been discovered that synthetic crystalline sodium zeolite A may be prepared by a unique and economical process which utilizes a reactive kaolin-type clay material as part of the starting aqueous reactant mixture.

The process of this invention, in its broadest scope, comprises digesting an aqueous reactant mixture containing oxides of silicon, aluminum and sodium in such proportions as hereinafter specified, a substantial portion of the oxides of silicon and aluminum being supplied by the inclusion of reactive kaolin in the reactant mixture, in the temperature range of about 20° C. to about 55° C. for at least 2 hours followed by crystallizing sodium zeolite A in the digested reactant mixture in the temperature range of about 75° C. to about 100° C. for at least 2 hours and recovering crystalline sodium zeolite A as the product.

The kaolin-type starting material may supply all or a part of the silica and alumina required for the particular initial reactant mixture used for obtaining zeolite A. Thus the aqueous reactant mixture in the aggregate contains silicate ions, aluminate ions, alkali metal ions, hydroxyl ions and possibly other ions.

Kaolin-type clays or clay minerals have the general composition approximately $Al_2O_3.2SiO_2.2-4H_2O$, which makes such clays preferred for the synthesis of crystalline zeolite A, which has a molar $SiO_2/Al_2O_3$ ratio of about two; however, by adjusting the starting mixture to the required reactant composition with other silica and/or alumina sources, other kaolin-type materials having molar $$SiO_2/Al_2O_3$$

ratios in the range of about 1.8 to nearly 2.3 may if desired be used in the process of this invention.

The data of Table B include analyses of some typical kaolin-type clays found to be suitable in the process of the invention. As may be seen, the mole ratio of $SiO_2/Al_2O_3$ in these examples varies, i.e. 1.9, 2.04 and 2.20 but is within the overall range between about 1.8 and 2.3.

The kaolin-type or two-layer clays may be considered as sheet-like silicates exhibiting various degrees of crystallinity. Their basic structural unit is an aluminosilicate sheet consisting of a layer of silicon cations in tetrahedral co-ordination with oxygen anions, bonded to a layer of aluminum cations in octahedral co-ordination with oxygen or hydroxyl anions. These sheets are stacked one on top of another to form the small plate-like crystals of the mineral. Representative of the clay minerals which contain this two-layer sheet and which may be used in the process of this invention are: kaolinite, livesite, nacrite, dickite, endellite and halloysite. They differ only in the way that the basic structural sheets are stacked. Pure kaolinite, $Al_2O_3.2SiO_2.2H_2O$, has the composition by weight

| | Percent |
|---|---|
| $Al_2O_3$ | 39.56 |
| $SiO_2$ | 46.54 |
| $H_2O$ (combined) | 13.90 |

Kaolin-type clay minerals when thermally treated appear to undergo several transitions, although the exact natures of the products of such transitions are not clearly known nor are the mechanisms of the behavior during heating completely understood. There is in fact considerable speculation and disagreement in the literature concerning this problem. When kaolin-containing clays are heated in air for a sufficient length of time, the first of these transitions is observed to begin at about 550° C.–600° C., where the crystalline silicate sheets are apparently destroyed or at least altered or disordered to yield a product which is essentially amorphous to X-rays. This transition product or metastable phase is sometimes referred to as "metakaolin," "metakaolinite," "dehydrated kaolin," or "dehydroxylated kaolinite." Roy et al. (Journal Amer. Ceram. Soc., 38, 205, 1955) have defined "metakaolinite" as "a metastable high-free-energy phase in the range 600° C. to 900° C." At about 950° C. another transition apparently occurs.

TABLE B

*Analyses of Typical Kaolin-Type Materials*

| Oxide | Georgia Kaolinite A | | Georgia Kaolinite B | | North Carolina Kaolinite C | | Utah Halloysite | |
|---|---|---|---|---|---|---|---|---|
| | Percent by wt. | Moles | Percent by wt. | Moles | Percent by wt. | Moles | Percent by wt. | Moles |
| $Na_2O$ | 0.2 | | 0.40 | | } 0.82 | | <0.1 | |
| $K_2O$ | <0.1 | | 0.43 | | | | | |
| $Al_2O_3$ | 40.2 | 1.0 | 37.20 | 1.00 | 37.2 | 1.0 | 37.3 | 1.00 |
| $SiO_2$ | 45.0 | 1.9 | 44.82 | 2.04 | 48.2 | 2.20 | 41.6 | 1.89 |
| Ign. loss (as $H_2O$) | 9.4 | 1.33 | 14.68 | 2.23 | 13.1 | 1.99 | 20.0 | 3.04 |
| $TiO_2$ | 2.5 | | 1.26 | | | | | |
| Other | 1.4 | | 1.31 | | 0.78 | | | |
| | 98.8 | | 100.1 | | 100.1 | | 98.9 | |

As stated hereinabove, the exact nature of the transformed kaolin associated with a thermal treatment at 550°–850° C. is not clearly known, because it is essentially amorphous to X-rays. By "amorphous to X-rays" is meant that the X-ray spectrometer trace or pattern exhibits substantially no sharp diffraction bands and is similar to that obtained for a glass. For reasons given hereinbelow this transformed kaolin as is used in the process of this invention will be referred to as "reactive kaolin."

Although kaolin-type materials have a chemical composition which makes them adaptable as reactants for the synthesis of crystalline sodium zeolite A, it has been discovered that such kaolin-type materials must undergo a conversion treatment before being useful, i.e., reactive, in the practice of this invention. The substantial conversion of kaolin-type materials to a highly reactive state by thermal means is a feature of the present invention.

Kaolin-type clays are also known by such names as "ball clay," "fireclay," "papermaking clay," "filler clay," "coating clay," and "china clay." Commercial kaolins may be contaminated with quartz, fine-grained mica, hydrous micas and sometimes feldspar, but their presence at impurity levels will generally not be detrimental to either the process or the zeolite A product.

In order that the reactive kaolin be easily suspended in and uniformly utilized at high rates of reaction in the process of this invention, it is preferred that it be in powdered form of (average) equivalent spherical diameter less than about 50 microns size, down to about 0.2 micron. Powder sizes up to about 200 mesh may be employed, with, however, some disadvantage in these regards.

When the clay material is to be converted to "reactive kaolin" by a thermal treatment, the temperatures and times at which the conversion is best carried out are interdependent. For instance, a minor degree of conversion will take place at temperatures at, and slightly below 550° C.; that is, on a percentage basis, there will be some reactive kaolin in any batch so treated. Above 600° C. and preferably between 600° C. and 850° C. total conversion to the reactive kaolin state might be expected if the firing conditions are maintained for a sufficient length of time. From the following discussion it will be clear that a higher firing temperature lessens the time required, and conversely at less than about 600° C., a considerably greater period will be required to bring about a suitable degree of conversion. At temperatures exceeding about 850° C., we have found that the kaolin conversion yields a material which when employed as the essential source of the oxides of silicon and aluminum for the production of zeolite A results in a product which is contaminated with increasing amounts of other molecular sieve type zeolites. A molecular sieve zeolite described as zeolite X in U.S. Patent 2,882,244 having adsorption pore openings of about 10 Angstrom units has been identified as one such contaminant.

The time interval during which the kaolin-type mineral should be held at 600°–850° C. in the firing step must also be controlled if substantial quantities of crystalline zeolite A are to be produced in the subsequent steps of the process of the invention.

It has been determined that at a firing temperature of 600° C. at least about 45 to 60 minutes are required to achieve a substantial degree of conversion to reactive kaolin and, subsequently, to produce substantial quantities of crystalline zeolite A. Although some alteration of the original kaoline structure was found to have occurred after a ten-minute firing at 600° C., digestion of this fired material showed that it was not sufficiently reactive to produce more than minor amounts of crystalline zeolite A. At the same time undesirably large amounts of hydroxy-sodalite were obtained in the product. The presence of hydroxy-sodalite, or other sodalite-type materials, none of which is a rigid three-dimensional crystalline ziolite of the molecular sieve type, to the extent of more than about 20 wt.-percent, and preferably not more than about 10 wt.-percent, in the solid product of the reaction steps described hereinbelow is undesirable because the molecular sieving properties and the adsorption capacity per unit volume of the solid product are correspondingly reduced. At firing temperatures of about 600° C. to 700° C., therefore, the firing time may be about one hour or more; in the region of about 700° C. to 800° C., firing times of as low as 10–15 minutes have been used with satisfactory results when relatively thin beds of charge material on the order of ¼–¾ inch in depth are used. However at 700°–850° C. at least about one hour is usually preferred to insure thorough treatment of the charge.

After a kaolin-type material has been brought into a reactive condition for the synthesis of crystalline zeolite A, this condition of reactivity is retained during storage periods. Thus, for example, in the process of this invention one may also use as a starting material commercially available kaolin-type materials that have already been suitably treated to achieve the desired transformation as previously described, or alternatively, a mixture comprising portions of an unfired kaolin and kaolin that has already been fired at temperatures not exceeding about 850° C. This mixture is then fired by heating within a furnace or by other suitable means to convert substantially all of the unfired material to the required "reactive kaolin" state.

Ambient air is preferred and is conveniently used as the atmosphere in which the kaolin-type materials are fired; however, other firing atmospheres may be used if desired. We have found that inert atmospheres such as a nitrogen stream may somewhat reduce the low-temperature level at which reactive kaolin can be prepared. In this respect acid gases such as $CO_2$ and HCl were found less effective as firing atmospheres than nitrogen, and moving gas streams slightly more effective than still air.

After having undergone a suitable firing treatment, the clay, now in the "reactive kaolin" state, is digested at prescribed temperatures in an aqueous mixture having an over-all composition, conveniently expressed in terms of oxide-mole-ratios, suitable for preparation of substantially pure sodium zeolite A. The other reactants used may include alkali metal hydroxide, and such sodium silicate and/or sodium aluminate as may be required, the ingredient being combined in such proportions that the initial over-all composition of the reaction mixture in terms of oxide-mole ratios is:

$$Na_2O/SiO_2 = a$$
$$SiO_2/Al_2O_3 = b$$
$$H_2O/Na_2O = c$$

where the particular values of $a$, $b$ and $c$ hereinbelow defined are the essential determinants. The initial mixing of reactants is preferably conducted at about room temperature.

In the preparation of sodium zeolite A as described hereinbelow, it has been found that the composition of the initial reactant mixture is critical. The digestion or reaction temperatures and the duration of the several reaction steps are also important variables in determining the yield of crystalline sodium zeolite A.

Certain reactant ratios are found to be useful in obtaining crystalline zeolite A from reactive kaolin-containing materials by the process of the invention. As an example, in preparing sodium zeolite A, also known as 4A, a reactant mixture derived at least in part from a reactive kaolin and having a composition, expressed in terms of oxide-mole ratios, within any of the following ranges may be employed:

|  | Range 1 | Range 2 |
|---|---|---|
| $Na_2O/SiO_2$ | about 0.5 to 1 | 1–1.4 |
| $SiO_2/Al_2O_3$ | 1 to 2.5 | 0.5–2.5 |
| $H_2O/Na_2O$ | 25–100 | 28–100 |

A preferred range of initial reactant compositions particularly suitable for preparing high-purity zeolite A from reactive kaolin is as follows:

$Na_2O/SiO_2$ _____ 1.2–1.4
$SiO_2/Al_2O_3$ _____ 1.75–2.0
$H_2O/Na_2O$ _____ 30–100

When the preferred kaolin-containing reactan, materials having a molar $SiO_2/Al_2O_3$ ratio around 2 are employed, the above reactant composition may be obtained without adding to the reactive kaolin substance any other reactants except alkali and water.

The method, according to the invention, includes two steps of processing the aqueous reactant mixture; the first step being that of digestion being conducted in the temperature range of 20°C to 55° C. and the second step, that of crystallization, being conducted in the temperature range of 75° C. to 100° C. The first or initial digestion step, while it may be performed at room temperature, is found to be appreciably shortened if conducted within a preferred range of 40° to 55° C., and furthermore permits a shorter second-step crystallization period. It has been found, for example, that in order to achieve a zeolite A purity exceeding about 90% in the final product, when the first or digestion step is carried out at about 20° C. a time of 8 or more hours is required and the second-step or crystallization period is usually rather extended, around 5 to 24 hours, whereas a time of between 3 and 4 hours suffices at a first-step temperature between about 40° and 55° C. in conjunction with crystallization periods of as short as 2 hours. Agitation of the reactant mixture may be conducted during one or both of the two steps, and is usually performed during both steps of a relatively large-scale process to achieve uniformity in the suspension and utilization of the reactive kaolin powder.

Although the nature of the reaction or reactions taking place in the first step are not clearly understood, it is believed that the reactant mixture may be undergoing a diffusion or ripening process. The net effect of this first step is that the reactant mixture is conditioned for a more complete conversion to zeolite A, i.e., higher product purity, in the crystallization step. It has been found that when the first-step digestion temperature is within the preferred range of 40° to 55° C., this first step only require as little as about 2 hours and may extend to about 6 hours. While somewhat longer times as digestion temperature are not detrimental to the process, such extended periods lengthen the over-all process time considerably and hence lack practicality from the point of view of economic operation on a relatively large scale.

When a first-step digestion temperature of between 40° and 55° C., is used, the duration of the crystallization step is preferably between about 2 and 5 hours for highest purity zeolite A. It should be noted that maintaining the zeolite A crystals in contact with the mother liquor for unduly long periods often results in the crystalline zeolite A changing or converting into other crystalline species and/or amorphous substances.

In the second or crystallization step, the aqueous reactant mixture is held at a temperature of between about 75° C. and 100° C. and preferably, in order to realize a zeolite A product purity above about 90%, in the range of about 80°–90° C. until crystals of the desired zeolite A form. The pressure at which the steps are preferably conducted is atmospheric or at least that corresponding to the vapor pressure of water in equilibrium with the reactant mixture at the temperature.

A preferred form of the invention is that wherein the reaction temperatures for the first and second steps are maintained between about 40° and 55° C., and between 80° and 90° C., respectively. These temperatures have been found to be particularly useful in producing sodium zeolite A, having at least 90% purity, on a plant scale. Another feature of this preferred method is the relatively short over-all reaction time required to achieve a high purity zeolite A product, in some cases as short as about 4 hours. We have found that, in order to realize desirably short processing times without lowering the zeolite A product purity below about 90%, the temperature of the second or crystallization step should be kept below about 90° C. When a first step reaction temperature between about 40° and 55° C. is employed in conjunction with second-step temperatures higher than about 90° C., there is a tendency for contaminating crystalline aluminosilicates to form in amounts exceeding 10%. Whether the formation of these contaminants is due to reconversion of some of the zeolite A crystals originally formed, as previously stated, or whether to the elevated temperatures maintained during both steps, since contaminant formation may be enhanced, under some conditions, as the reaction temperature approaches 100° C., is not clear.

Exemplary of the practice of a preferred form of the present invention and particularly suitable for large-scale production of high-purity zeolite A is the following procedure:

A slurry made up of reactive kaolin-type clay having a $SiO_2/Al_2O_3$ molar ratio of about 2, sodium hydroxide solution and water is prepared by first pumping the aqueous caustic into a storage tank, followed by water at about 185° F. (85° C.) which has been heated in a heat exchanger or by other suitable means; powdered fired clay is then discharged into the tank while agitation proceeds to insure a homogeneous slurry. The resultant slurry, having a molar composition of $Na_2O/SiO_2$ _____ About 1.2
$SiO_2/Al_2O_3$ _____ About 2
$H_2O/Na_2O$ _____ 30–45 is then allowed to digest for about 4 hours at about 122° F. (50° C.) with continuous agitation. In the second step the slurry is sent to crystallization vessels through slurry heaters which raise the temperature to about 185° F. (85° C.). This temperature is maintained for about 2 hours to complete the crystallization of high purity zeolite A. The crystalline zeolite A product is separated from the mother liquor by filtration, followed by washing of the crystals until the pH of the effluent wash water is between about 9 and 12.

The beneficial effects of the two-step process for producing crystalline zeolite A from reactive kaolin are demonstrated by the data shown in Table C. Using a reactive kaolin, reactant mixtures of about 105 grams each were prepared having the molar composition $Na_2O/SiO_2$ _____ 1.4
$SiO_2/Al_2O_3$ _____ 1.75
$H_2O/Na_2O$ _____ 40 and first digested for various periods of time at room temperature (20° C.–25° C.) before the second step at 100° C. X-ray analysis and adsorption measurements of the crystalline products indicated that when only a single step of 24 hours at 100° C. was used, the zeolite A purity did not exceed 79%, while a first-step digestion period of an hour gave a worthwhile increase in purity. Holding the reactant mixture for as long as 3 hours in the first digestion step, however, yielded greater than 90% product purity, when an extended second-step treatment of 24 hours at 100° C. was employed.

TABLE C

*Effect of Two-Step Process on Zeolite A Product Purity*

| Room Temp.* b c Digestion Period, Hr. | Product Purity, a Wt.-Percent Type A Zeolite |
|---|---|
| 0 | 79 |
| 1 | 88 |
| 3 | 90 |
| 8 | 94 |
| 16 | 95 |
| 24 | 97 |
| 168 | 100 | a Determined by adsorption measurements.
b Second-step conducted at 100° C. for 24 hours.
c Kaolin fired at 775° C.
*20–25° C.

According to the invention, it has been found that the composition of the reactant mixture used during the first or digestion step need not necessarily be maintained at the same values during the second or crystallization step. For example, in a relatively large-scale process, one may, in conducting the second-digestion step at temperatures on the order of about 75 to 100° C., wish to use as a heating means steam introduced directly into the reactant mixture. Such introduction will of course gradually increase the $H_2O/Na_2O$ ratio in the mixture. Also, for reasons of equipment or handling problems, one may wish to have a smaller quantity of reactant mixture in the first step and then adjust to the final ratio or ratios by addition of the necessary reactants between the first and second steps.

It is also to be expected that when reactant compositions outside the range or ranges given above are used, larger than minor amounts of other crystalline zeolites, hydroxysodalite, or amorphous substances may appear in the product in admixture with zeolite A.

After the second or crystallization step, the zeolite A crystals are filtered off. The reaction magma may be filtered at the reaction temperature if desired, or the hot magmas may be cooled to room temperature before filtering. The filtrate or mother liquir resulting may be reused after adjustment with the proper amounts of reactants to give a properly proportioned reactant mixture. The mass of zeolite A crystals is washed (conveniently on the filter) until the effluent wash water in equilibrium with the zeolite has a pH of between about 9 and 12.

Thereafter, the crystals are dried, conveniently in a vented oven at a temperature of between about 25° C. and 150° C. For X-ray and chemical analysis this drying is sufficient. The individual crystals of the synthetic sodium zeolite A usually appear to be cubic. Most of the crystals have a size in the range 1 micron to 5 microns, but smaller and larger crystals can occur covering the size range of 0.4 micron to 15 microns.

Subsequent to the second or crystallization step, depending on the relative purity of the kaolin-type material employed as the raw material, one may find that the zeolite A product is associated with non-zeolitic impurities originally present in the kaolin. Occasionally, the zeolite A product may also be associated with an acid-soluble material. If separation of such impurities from the zeolite A crystals is desired, this may be accomplished by such methods as water settling or air flotation.

The crystalline zeolite A product is conveniently identified by such means as X-ray diffraction, adsorption and chemical analysis.

As previously defined, product purity is determined by referencing the intensities of certain X-ray lines in the sample being measured to the intensities of the same lines in a standard sample of sodium zeolite A. At least one X-ray diffraction spectrometer trace was secured of every sodium zeolite A product. From these traces crystalline zeolite A was identified. When proper hydration controls were run (standard zeolite A in the same hydration state run on the same day), estimates of percent composition could be made by comparing the intensities of certain X-ray lines in the product with the intensities of the same lines in the standard. X-ray determinations of the purity of the zeolite A products were usually lower than the determinations of purity based on adsorption measurements described below. Because of this difference, the reason for which is not entirely clear, the values of product purity reported herein by the X-ray method are minimum values.

Adsorption measurements on samples of the zeolite A products obtained by the process of this invention were carried out in a McBain-Baker adsorption system. Before adsorption measurements are made, the crystalline sodium zeolite A powder must be activated or dehydrated by heating, preferably at reduced pressure, for example at 350° C. and at a pressure of less than about 0.1 mm. Hg. As can be seen from the representative data of Table C, the activated zeolite A products have the expected molecular sieve properties.

TABLE D

*Typical Adsorption Data for Activated Sodium Zeolite A Product*

| Adsorbate | Temp., °C. | Pressure mm. Hg. | Std. 4A | Product From Reactive Kaolin |
| --- | --- | --- | --- | --- |
| Nitrogen | −196 | 700 | 0.4 | 0.8 |
| Oxygen | −183 | 746 | 24.0 | 24.0 |
| Water | 25 | 24 | 27.9 | 26.3 |
| Propane | 25 | 600 | 0.4 | 0.8 |
| Propylene | 25 | 700 | 12.3 | 12.4 |
| Argon | −183 | 700 | 2.1 | 3.2 |

The reference standards by which relative purities of the zeolite A products of the invention were determined were very pure samples of zeolite A prepared using conventional reactants, i.e., sodium silicate, sodium hydroxide and sodium aluminate. As used herein, the terms "product purity" in percent and "product composition" in percent, when based on this adsorption method of analysis, are defined as:

$W_1/W_2 \times 100 =$ percent product purity where:

$W_1 =$ Weight loading of adsorbate measured on the activated zeolite A sample,
$W_2 =$ Weight loading of same adsorbate measured on the activated zeolite A reference standard.

The products of the invention may readily be ion-exchanged to other ion forms by employing conventional ion exchange methods. For example, a batch of the sodium form of zeolite A was converted to the calcium form by placing the material in columns and contacting it with hot 1 M $CaCl_2$ solutions. Chemical analysis of the product showed that the crystals were 97% exchanged to the calcium form.

Typical examples of the method of obtaining sodium zeolite A according to the process of the invention are given below.

EXAMPLE A

*Preparation of Sodium Zeolite A from Kaolinite*

A sample of reactive kaolin weighing 10.0 grams, obtained from a batch of a Georgia kaolinite that had been fired for 3 hours at 775° C., was dispersed by blending into a sodium aluminate-sodium hydroxide-water mixture. The over-all composition of the reactant mixture, in terms of oxide-mole ratios, then corresponded to $Na_2O/SiO_2$ _____ 1.4
$SiO_2/Al_2O_3$ _____ 1.75
$H_2O/Na_2O$ _____ 40

The reactant mixture was placed in an 8-oz. jar, sealed and allowed to digest at room temperature for 24 hours. In the second or crystallization step the mixture was heated in a steam bath at 100° C. for 24 hours. At the end of this period the solid product was filtered and washed with distilled water to a pH of about 10. After oven-drying at 110° C. a sample was submitted for X-ray analysis. The spectrometer tracing indicated a sodium zeolite A content of 82%. Adsorption determinations showed that the product actually contained 97% sodium zeolite A.

EXAMPLE B

*Preparation of Sodium Zeolite A from Kaolinite*

Eight samples of reactive kaolin weighing 10.0 grams each, obtained from a batch of kaolinite that had been fired at 700° C. for 1 hour, were each dispersed into sodium hydroxide-water mixtures. The over-all composition of the reactant mixture in terms of oxide-mole ratios then corresponded to $Na_2O/SiO_2$ _____ 1.4
$SiO_2/Al_2O_3$ _____ 1.9
$H_2O/Na_2O$ _____ 40

After placing each mixture in an 8-oz. jar and sealing, the systems were allowed to digest at 50° C. for periods of time ranging from 0.5 to 24 hours. All the systems were then heated at 100° C. for 24 hours. At the conclusion of this crystallization period all the systems were filtered and washed to a pH of about 10, oven-dried at 110° C. and submitted for X-ray analysis. Spectrometer tracings indicated that the zeolite A content of the products ranged from about 75% to about 85%.

EXAMPLE C

*Preparation of Sodium Zeolite A From a Commercial Fired Kaolin*

To a solution of caustic prepared by adding 107 gallons of a 50% caustic solution to 471 gallons of water, were added 800 pounds of a Georgia kaolin clay that had been suitably fired to bring it to a reactive condition. After mixing with a propeller-type mixer, the reactant mixture, having the composition $Na_2O/SiO_2$ _____ 1.2
$SiO_2/Al_2O_3$ _____ 2
$H_2O/Na_2O$ _____ 30 was allowed to digest quiescently at room temperature for 8 hours. At the end of the period an additional 66 gallons of water was added. The mixture was then heated to 190–195° F. by pumping through a slurry heater where steam was added. This brought the $H_2O/Na_2O$ ratio to 40. After 4¾ hours crystallization at 195° F., the crystalline product was filtered and washed and samples taken for adsorption and X-ray analysis. After activation, adsorption measurements of eight samples of filter cake indicated a purity of about 90% zeolite A.

EXAMPLE D

*Preparation of Sodium Zeolite A From a Commercial Fired Kaolin*

Representative samples from a 1,000-pound lot of a fired kaolin which had been fired at 725–775° C. by a commercial supplier were used as the basis for five zeolite A reactant mixtures of the composition:

| | |
|---|---|
| $Na_2O/SiO_2$ | 1.2 |
| $SiO_2/Al_2O_3$ | 2.0 |
| $H_2O/Na_2O$ | 40 |

The first digestion step was conducted at room temperature for 16 hours, and the second step at 80–85° C. for 8 hours. X-ray and oxygen adsorption analyses of the products indicated 4A contents ranging from 90 to 92 percent.

EXAMPLE E

*Preparation of Sodium Zeolite A From Fired Kaolin*

A reactant mixture containing 8 pounds of a commercial fired kaolin, 3200 grams of sodium hydroxide, and 30,000 grams of water was prepared. The over-all composition of this mixture was, in terms of oxide-mole ratios,

| | |
|---|---|
| $Na_2O/SiO_2$ | 1.25 |
| $SiO_2/Al_2O_3$ | 2.0 |
| $H_2O/Na_2O$ | 42 |

The reactant mixture was agitated in a 10-gallon kettle while maintained at 45° to 50° C. for 4 hours. At the conclusion of the first step the kettle temperature was raised to 80° to 85° C. and the agitation continued for 3.5 hours. X-ray and oxygen adsorption analyses (22.3 wt. percent $O_2$ adsorbed at 100 mm. Hg and −183° C.) of the solid product indicated that zeolite A of better than 90% purity had been produced.

Crystalline zeolite A made by the process of this invention when activated is useful as an adsorbent for many purposes in any suitable form. For example, activated crystalline zeolite A in powder form may be used in an adsorption column or bed to carry out an adsorption process, or along with a bonding agent may be formed into pellets for various adsorption applications.

Various changes or modifications may be made in the processes disclosed herein while securing to a greater or lesser extent some or all of the benefits of the invention, without departing from the spirit and scope thereof.

What is claimed is:

1. An improved method for producing sodium zeolite A which comprises forming an aqueous reactant mixture containing essentially oxides of aluminum, silicon and sodium, the major portion of said aluminum and silicon oxides being provided by inclusion in the mixture of a reactive kaolin type material, said oxides of aluminum, silicon and sodium being present in said aqueous reactant mixture in amounts such that the mixture has a composition expressed in oxide mole ratios within the following range:

| | |
|---|---|
| $Na_2O/SiO_2$ | About 0.5–1 |
| $SiO_2/Al_2O_3$ | 1–2.5 |
| $H_2O/Na_2O$ | 25–100 | digesting the aqueous reactant mixture for a period of at least 2 hours within a temperature range of 20–55° C., thereafter increasing said temperature to at least 75° C. and maintaining said temperature for a sufficient period to crystallize sodium zeolite A, thereafter recovering crystalline sodium zeolite A as the product.

2. A method substantially as described in claim 1 wherein the aqueous reactant mixture is digested for a period of approximately 2 to 36 hours at a temperature within the range of 20–55° C., and thereafter increasing the temperature to within the range of 75 to 100° C., which temperature is maintained for approximately 2 to 30 hours to crystallize the sodium zeolite A.

3. A method substantially as described in claim 1 wherein the aqueous reactant mixture is digested for a period of approximately 2 to 6 hours at a temperature within the range of 40 to 55° C., thereafter said mixture is heated to a temperature of 80–90° C., at which temperature it is maintained for approximately 2–5 hours to crystallize the sodium zeolite A.

4. A method substantially as described in claim 1 wherein the aqueous reactant mixture has a composition expressed in oxide mole ratios within the range of

| | |
|---|---|
| $Na_2O/SiO_2$ | 1.2–1.4 |
| $SiO_2/Al_2O_3$ | 1.75–2.0 |
| $H_2O/Na_2O$ | 28–100 |

5. Method for producing sodium zeolite A which comprises forming an aqueous reactant mixture containing essentially oxides of aluminum, silicon and sodium the major portion of said aluminum and silicon oxides being provided by inclusion in the mixture of a reactive kaolin type material, said oxides of aluminum, silicon and sodium being present in said aqueous reactant mixture in amounts such that the mixture has a composition expressed in oxide mole ratios as follows:

| | |
|---|---|
| $Na_2O/SiO_2$ | About 1.2 |
| $SiO_2/Al_2O_3$ | About 2 |
| $H_2O/Na_2O$ | 30–45 | digesting said reactant mixture for approximately 4 hours at a temperature of about 50° C. and thereafter heating the mixture to about 85° C. and maintaining said temperature for approximately 4 hours to crystallize the sodium zeolite A.

6. A method substantially as described in claim 5 wherein the aqueous reactant mixture has a composition expressed in oxide mole ratios as follows:

| | |
|---|---|
| $Na_2O/SiO_2$ | 1.4 |
| $SiO_2/Al_2O_3$ | 1.75 |
| $H_2O/Na_2O$ | 40 | said mixture thereafter being digested at approximately 20° C. for 24 hours after which the mixture is heated to 100° C. at which temperature it is maintained for approximately 24 hours to crystallize sodium zeolite A.

7. A method substantially as described in claim 5 wherein the aqueous reactant mixture has a composition expressed in oxide mole ratios as follows:

| | |
|---|---|
| $Na_2O/SiO_2$ | 1.2 |
| $SiO_2/Al_2O_3$ | 2.0 |
| $H_2O/Na_2O$ | 30 | said mixture thereafter being digested at approximately 20° C. for 8 hours, after which the mixture is heated to approximately 90° C., at which temperature it is maintained for approximately 4¾ hours to crystallize sodium zeolite A.

8. An improved method for producing sodium zeolite A which comprises forming an aqueous reactant mixture containing essentially oxides of aluminum, silicon and sodium, the major portion of said aluminum and silicon oxides being provided by inclusion in the mixture of a reactive kaolin type material, said oxides of aluminum, silicon and sodium being present in said aqueous reactant mixture in amounts such that the mixture has a composition expressed in oxide mole ratios within the following range:

| | |
|---|---|
| $Na_2O/SiO_2$ | 1–1.4 |
| $SiO_2/Al_2O_3$ | 0.5–2.5 |
| $H_2O/Na_2O$ | 28–100 | digesting the aqueous reactant mixture for a period of at least 2 hours within a temperature range of 20–55° C., thereafter increasing said temperature to at least 75° C. and maintaining said temperature for a sufficient period to crystallize sodium zeolite A, thereafter recovering crystalline sodium zeolite A as the product.

9. A method substantially as described in claim 8, wherein the aqueous reactant mixture is digested for a period of approximately 2 to 36 hours at a temperature within the range of 20–55° C., and thereafter increasing the temperature to within the range of 75 to 100° C., which temperature is maintained for approximately 2 to 30 hours to crystallize the sodium zeolite A.

10. A method substantially as described in claim 8, wherein the aqueous reactant mixture is digested for a period of approximately 2 to 6 hours at a temperature within the range of 40 to 55° C., thereafter said mixture is heated to a temperature of 80–90° C., at which temperature it is maintained for approximately 2–5 hours to crystallize the sodium zeolite A.

References Cited in the file of this patent

UNITED STATES PATENTS

| | | |
|---|---|---|
| 2,544,695 | Kumins | Mar. 13, 1951 |
| 2,841,471 | Sensel | July 1, 1958 |
| 2,847,280 | Estes | Aug. 12, 1958 |
| 2,882,243 | Milton | Apr. 14, 1959 |
| 2,979,381 | Gottstine et al. | Apr. 11, 1961 |
| 2,992,068 | Haden et al. | July 11, 1961 |

OTHER REFERENCES

Kumins et al.: "Ind. and Eng. Chem." (Ind. Ed.), 45, 567–572 (1953).